United States Patent
Feyling

(10) Patent No.: US 10,669,700 B2
(45) Date of Patent: Jun. 2, 2020

(54) WIRELESS COMMUNICATION ELECTRONICS STORAGE APPARATUS AND METHOD OF MOUNTING THE SAME IN A DRY BARREL HYDRANT

(71) Applicant: Kennedy Valve Company, Elmira, NY (US)

(72) Inventor: Arne Feyling, Corning, NY (US)

(73) Assignee: Kennedy Valve Company, Elmira, NY (US)

( * ) Notice: Subject to any disclaimer, the term of this patent is extended or adjusted under 35 U.S.C. 154(b) by 0 days.

(21) Appl. No.: 16/122,089

(22) Filed: Sep. 5, 2018

(65) Prior Publication Data

US 2020/0071916 A1 Mar. 5, 2020

(51) Int. Cl.
| | |
|---|---|
| *E03B 9/06* | (2006.01) |
| *E03B 7/07* | (2006.01) |
| *H04W 4/38* | (2018.01) |
| *F16J 15/3268* | (2016.01) |
| *F16K 27/00* | (2006.01) |

(52) U.S. Cl.
CPC ............... *E03B 9/06* (2013.01); *E03B 7/072* (2013.01); *H04W 4/38* (2018.02); *F16J 15/3268* (2013.01); *F16K 27/006* (2013.01)

(58) Field of Classification Search
CPC ... E03B 9/06; E03B 7/072; E03B 9/02; E03B 9/04; Y10T 137/5468; H04W 4/38
USPC ..................................... 138/89, 94, 110, 114
See application file for complete search history.

(56) References Cited

U.S. PATENT DOCUMENTS

| | | | | |
|---|---|---|---|---|
| 3,899,196 A | * | 8/1975 | Dashner | E03B 9/04 |
| | | | | 285/2 |
| 4,033,372 A | * | 7/1977 | Bowman | E03B 9/06 |
| | | | | 137/296 |
| 4,791,952 A | * | 12/1988 | Laurel | E03B 9/04 |
| | | | | 137/15.02 |
| 7,156,119 B2 | * | 1/2007 | Freudendahl | F16K 15/026 |
| | | | | 137/300 |
| 7,980,317 B1 | * | 7/2011 | Preta | E03B 9/02 |
| | | | | 169/60 |
| 8,657,021 B1 | * | 2/2014 | Preta | A62C 37/50 |
| | | | | 169/54 |
| 8,701,709 B2 | * | 4/2014 | Athanasiades | A62C 99/00 |
| | | | | 137/599.11 |
| 9,334,976 B1 | * | 5/2016 | Wood | F16K 17/34 |
| 2008/0189056 A1 | * | 8/2008 | Heidl | G01F 15/005 |
| | | | | 702/45 |
| 2008/0281534 A1 | * | 11/2008 | Hurley | F17D 5/00 |
| | | | | 702/47 |
| 2013/0206241 A1 | * | 8/2013 | Fleury, Jr. | E03B 9/02 |
| | | | | 137/1 |

(Continued)

OTHER PUBLICATIONS

Telog, Automated Wireless Monitoring of Water Distribution Systems, Mar. 2014.

*Primary Examiner* — Craig M Schneider
*Assistant Examiner* — Kevin R Barss
(74) *Attorney, Agent, or Firm* — Brown & Michaels, PC

(57) ABSTRACT

A wireless communication electronics storage apparatus that stores wireless communication electronics at a fire hydrant and provides access for electronic connections of the wireless communication electronics to sensors located within the fire hydrant at a main valve below ground level, and a method of mounting wireless communication electronics to a fire hydrant.

20 Claims, 6 Drawing Sheets

(56) References Cited

U.S. PATENT DOCUMENTS

2016/0180974 A1\* 6/2016 Malloy, III ............. F16K 1/385
              376/210
2017/0082592 A1   3/2017 Morrow
2017/0216645 A1\* 8/2017 Silvers ................... A62C 37/50

\* cited by examiner

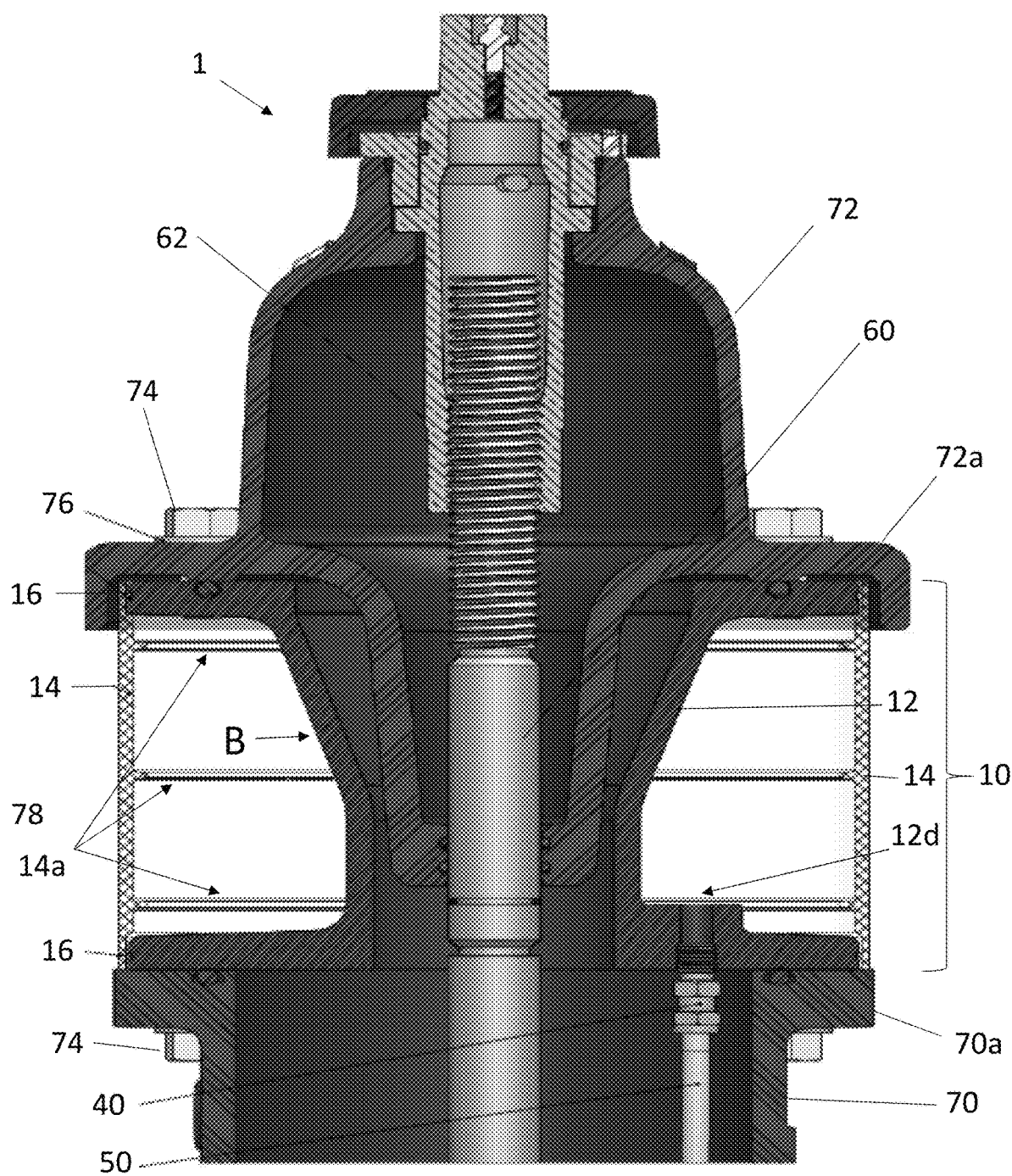

WIRELESS COMMUNICATION ELECTRONICS STORAGE APPARATUS AND METHOD OF MOUNTING THE SAME IN A DRY BARREL HYDRANT

BACKGROUND OF THE INVENTION

Field of the Invention

The invention pertains to the field of fire hydrants. More particularly, the invention pertains to a wireless communication electronics storage apparatus for a dry barrel of a fire hydrant, and method of mounting the same.

Description of Related Art

FIG. 1A illustrates a method of automated wireless monitoring of water distribution systems in a publication titled "Automated Wireless Monitoring of Water Distribution Systems," by Telog®, published March 2014. In FIG. 1A, a meter Ru-32m (see publication at pages 10-11) can be used to monitor interval flow data and meter register data for billing. This meter is described to be located in an underground meter vault. An optional burial antenna (described at page 12) can be installed below road or sidewalk surfaces. The meter is also described to provide wireless flow/pressure monitoring (described at page 13) However, "vaults" are not regular in the main distribution system, as many times vaults are not used at all, and the costs of installing vaults separately from the main distribution system are extensive and economically inefficient.

FIG. 1B illustrates a Hydrant Pressure Monitoring device HPR-32i also described in the publication titled "Automated Wireless Monitoring of Water Distribution Systems," by Telog®, published March 2014 (pages 11 and 13). This device is referred to as a pressure impulse recorder. This recorder is described to capture water hammer and negative pressure event waveforms in a memory and wirelessly download the waveforms to a Telog host computer application. As illustrated, this recorder attaches to a water output port of a fire hydrant. However, Dry Barrel Hydrants are intended to be, and are required to be dry. Mounting Telog's® monitoring device in a hydrant's output port requires the hydrant to be open & full of water. The installation of such a monitor at a hydrant's output port also hinders that port's usefulness.

SUMMARY OF THE INVENTION

The foregoing and/or other features and utilities of the present inventive concept can be achieved by providing an upper hydrant wireless communication electronics storage apparatus comprising: a spool including: a body portion in the shape of a tube and having a hollow inside, a first end, and a second end; a first flange connected to the first end of the body portion and having a disc shape with a hole extending through the middle section thereof, the first flange including a first groove extending around an outer edge, a second groove extending around an outer surface and a plurality of holes extending around an outer periphery thereof between the outer edge of the second groove; and a second flange connected to the second end of the body portion and having a disc shape with a hole extending through the middle section thereof, the second flange including a groove extending around an outer edge and a plurality of holes extending around an outer periphery thereof adjacent the outer edge; and an O-ring disposed in each of the first groove and second groove of the first flange and the groove of the second flange; and a tubular device configured to slide over the first and second flanges such that a first end thereof forms a tight seal with the O-ring disposed in the first groove of the first flange and a second end thereof forms a tight seal with the O-ring disposed in the groove of the second flange.

In accordance with an exemplary embodiment, the body of the spool may taper inward from the first flange to the second flange.

In accordance with another exemplary embodiment, the tubular device may be formed of an impact resistant plastic.

In accordance with still another exemplary embodiment, the second flange can further include a compression fitting hole extending therethrough adjacent the body portion to receive a compressing fitting therein.

In accordance with yet another exemplary embodiment, tubular device can include one or more ribs extending from an inner surface thereof and disposed at a predetermined distance from each other, the ribs having respective lengths to contact the outer surface of the body portion of the spool.

In accordance with yet another exemplary embodiment, the tubular device is formed of a polyvinyl chloride (PVC) pipe or a polycarbonate/acrylonitrile butadiene styrene (ABS) blend.

In accordance with yet another exemplary embodiment, the tubular device and the ribs are integrally formed.

In accordance with yet another exemplary embodiment, the spool can be formed of steel or a steel blend.

In accordance with still another exemplary embodiment, the plurality of holes in the first flange and the second flange can include threads therein to receive threaded bolts.

The foregoing and/or other features and utilities of the present inventive concept can also be achieved by providing an electronics containment apparatus useable with a fire hydrant, the apparatus comprising: first and second discs integrally formed with a body disposed therebetween, the first and second discs including grooves extending around outer edges thereof to receive and O-ring therein, a plurality of holes extending around a periphery thereof adjacent to the outer edge, and a hole extending through a center portion thereof, and the body including a hole extending through a center thereof to connect the holes of the first and second discs; an O-ring disposed in each of the grooves of the first and second discs; and a tubular member having an inner surface of one end in pressing contact with the O-ring disposed in the groove of the first disc and an inner surface of an opposite end in pressing contact with the O-ring disposed in the groove of the second disc.

In accordance with an exemplary embodiment, the plurality of holes in the first and second discs can be threaded to receive a respective threaded bolt to fasten the first disc to a bonnet of a fire hydrant and to fasten the second disc to an end of an upper barrel of a first hydrant.

In accordance with another exemplary embodiment, the first disc may further comprise a circular groove formed in an outer side thereof between the plurality of holes and the hole extending through the center portion, the groove configured to receive an O-ring therein and provide a seal between the first disc and a bottom end of the bonnet.

In accordance with still another exemplary embodiment, the body can taper outward from the second disc to the first disc such that the body can receive a bottom portion of the bonnet in the outward tapered end.

The foregoing and/or other features and utilities of the present inventive concept can also be achieved by providing a method of mounting wireless communication electronic support equipment for sensors disposed below ground in a first hydrant, the method comprising: fastening a first disc member to a bonnet of a fire hydrant; fastening a second disc member to an upper barrel of the first hydrant; maintaining the bonnet and upper barrel a distance apart with a body portion connected at one end to the first disc member and connected at an opposite end to the second disc member; and sealing an inner surface of a first end of an impact resistant tubular member to a circumferential edge of the first disc member and an inner surface at a second end of the tubular member to a circumferential edge of the second disc member to form a weather-proof area between the first and second disc members for placement of the wireless communication electronic equipment.

In accordance with an exemplary embodiment, the method may further comprise fastening the first disc member to the bonnet using bolts and a waterproof washer that prevents moisture from entering respective bolt holes in the first and second disc members.

In accordance with another exemplary embodiment, the method may further comprise forming the tubular member from one of a polyvinyl chloride (PVC) pipe or a polycarbonate/acrylonitrile butadiene styrene (ABS) blend.

In accordance with still another exemplary embodiment, the body portion can be tapered inward from the first disc member to the second disc member and can be hollow inside such that an extended bottom portion of the bonnet can extend into the body portion.

In accordance with still another exemplary embodiment, the method can further comprise forming a hole through the second disc member to allow wires to extend from the area between the first and second discs through the fire hydrant to sensors disposed at a main valve of the fire hydrant below ground.

In accordance with yet another exemplary embodiment, the method may further comprise forming a groove around the circumferential edge of the first disc member and the second disc member; and inserting an O-ring in the grooves of each of the first disc member and the second disc member which each form a tight seal with the inner surface of the tubular member.

In accordance with yet another exemplary embodiment, the method may further comprise forming a circular groove around a side surface of the first disc member opposite the side connected to the body portion; and inserting an O-ring into the circular groove to form a seal between the first disc member and an outer lip of the bonnet.

BRIEF DESCRIPTION OF THE DRAWING

FIG. 2B illustrates an operational view of a wireless communication electronics storage apparatus usable with a fire hydrant according to another exemplary embodiment of the present inventive concept.

DETAILED DESCRIPTION OF THE INVENTION

Figure 1A:
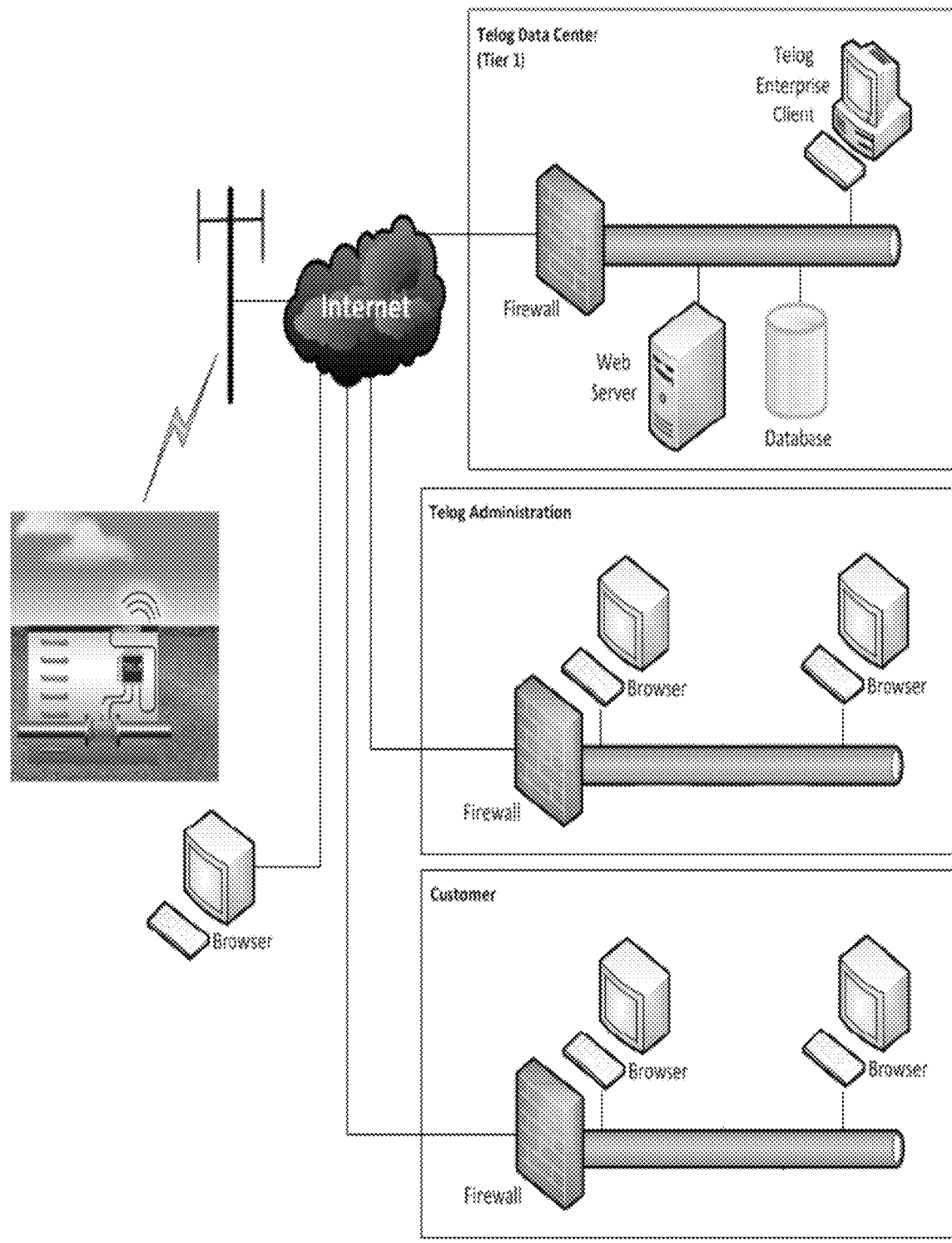
FIG. 1A illustrates a method of automated wireless monitoring of water distribution systems and the positioning of such monitors in an underground meter vault, according to a conventional water monitoring system.
Figure 1B:
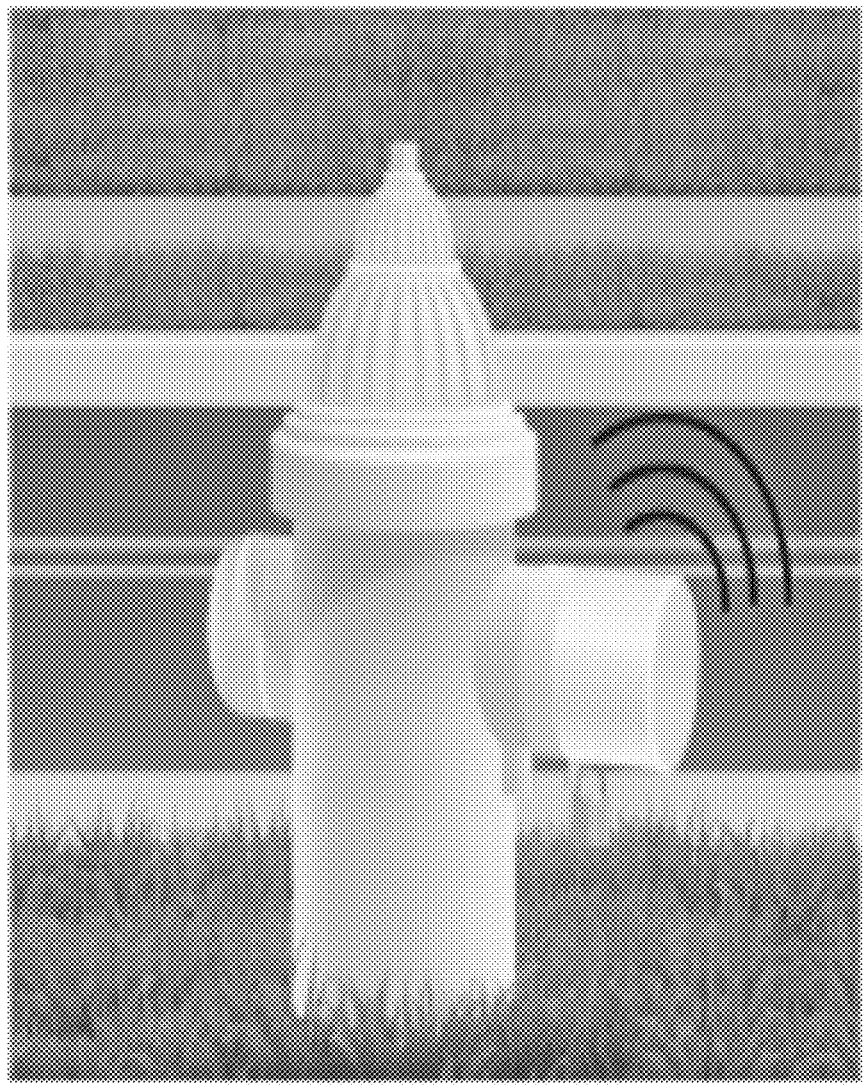
FIG. 1B illustrates the positioning of a remote communication system of FIG. 1 disposed within a water output port of a fire hydrant, according to a conventional system.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the Figures Spatially relative terms may be intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2A:
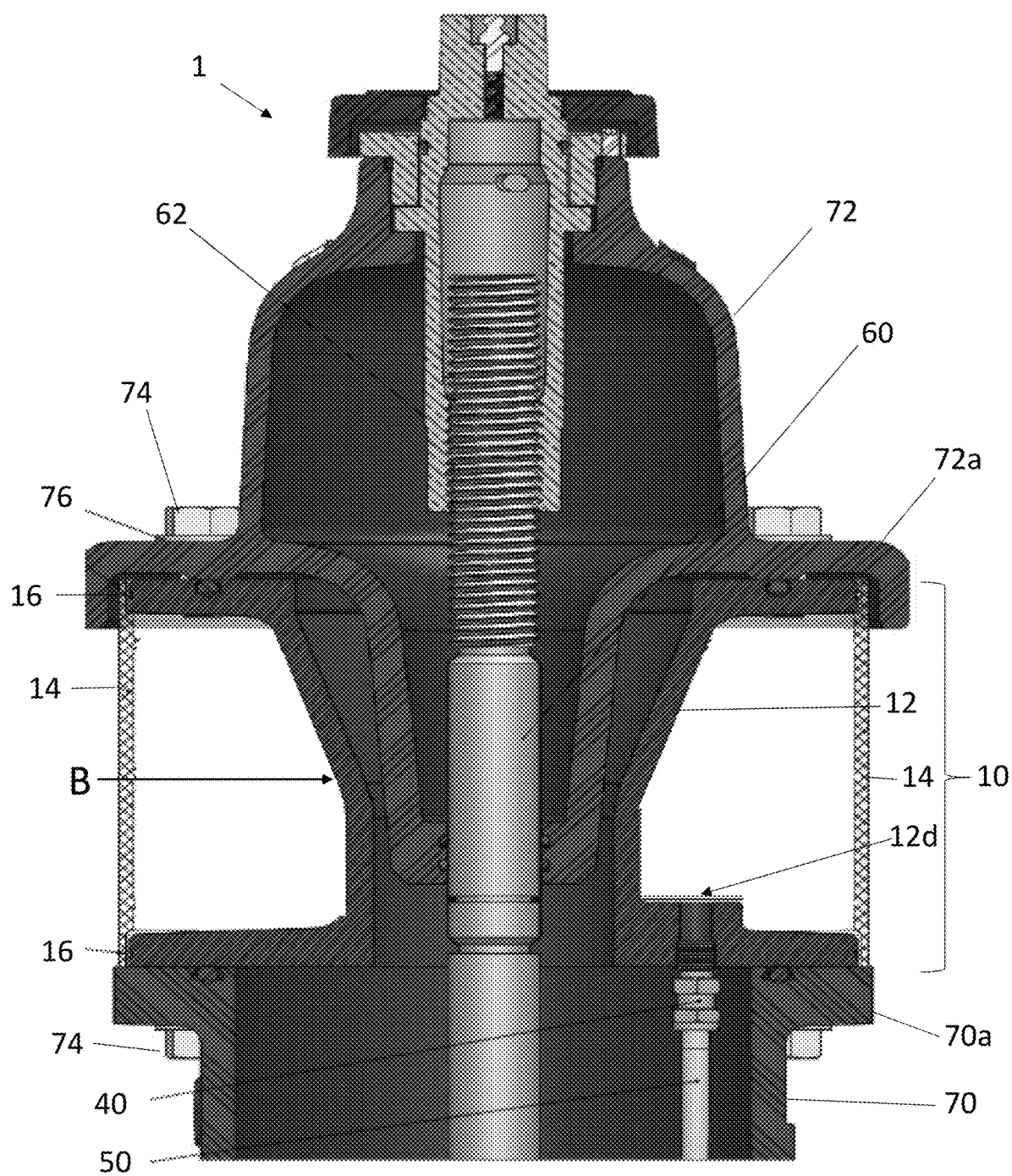
FIG. 2A illustrates an operational view of a wireless communication electronics storage apparatus usable with a fire hydrant according to an exemplary embodiment of the present inventive concept.

FIG. 2A illustrates an upper portion of a fire hydrant 1 including a wireless communication electronics storage apparatus 10, according to an exemplary embodiment of the present inventive concept. Referring to FIG. 2A, an upper portion of the fire hydrant 1 can include an upper barrel 70, a cap or bonnet 72, a stem 60, and an operating stem nut 62. The operating stem nut 62 connects the stem 60 to the bonnet 72 of the fire hydrant 1. The stem 60 is located at a center portion of the bonnet 72 and extends axially along the internal portion of the upper barrel 70. The stem 60 connects to a main valve (not illustrated to provide brevity to the detailed description) and can open and close the main valve when the operating stem nut 62 it turned, thus raising and lowering the stem 60.

In conventional fire hydrants, the bonnet 72 is generally bolted directly to the upper barrel 70. A circular lip 72a of the bonnet 72 can extend outward and around a periphery of a bottom end of the bonnet 72. The lip 72a of the bonnet 72 is formed to be seated on one end of a lip 70a of the upper barrel 70 and to be fixedly engaged with the lip 70a of the upper barrel 70. However, in accordance with an example embodiment of the present inventive concept, as illustrated in FIG. 2, the wireless communication electronics storage apparatus 10 can be disposed between the upper barrel 70 and the bonnet 72. The wireless communication electronics storage apparatus 10 separates the bonnet 72 from the upper barrel 70 by a predetermined distance while connecting to both the bonnet 72 and the upper barrel 70. A spool 12 of the wireless communication electronics storage apparatus 10 can be made of steel or a form of steel, or other metals that resist corrosion and have a strength that can withstand external environmental conditions and pressures of maintaining a connection to both an iron bonnet 72 and iron upper barrel 70 of a fire hydrant 1. The distance that the wireless communication electronics storage apparatus 10 can separate the bonnet 72 from the upper barrel 70 depends on the height of the wireless communication electronics storage apparatus 10. The height of the wireless communication electronics storage apparatus 10 can depend on the type of material in which the spool 12 is formed, a thickness of the spool 12, weather conditions of the environment in which the spool 12 is used, among many other variables to be considered. It is to be noted that the spool 12 can be manufactured to any thickness and formed of any type of material that will provide the intended benefits and functionality as described herein. The wireless communication electronics storage apparatus 10 also comprises a weather guard 14, as is described in detail below.

Figure 3A:
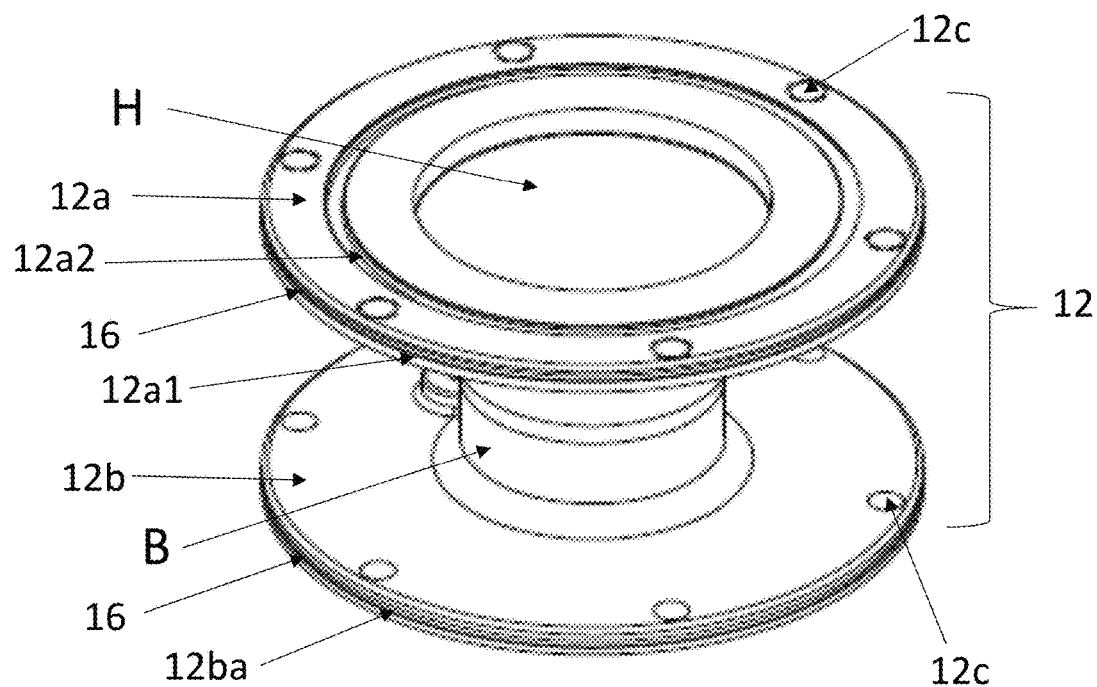
FIG. 3A illustrates a spool of the wireless communication electronics storage apparatus according to the exemplary embodiment of FIGS. 2 and 2B.

Referring to FIG. 3A, the spool 12 part of the wireless communication electronics storage apparatus 10 illustrated in FIG. 2A can include a first flange (or disc) 12a and a second flange (or disc) 12b. The first flange 12a can be connected to one end of a tubular body portion B of the spool 12 and the second flange 12b can be connected to an opposite end of the body portion B of the spool 12 such that the flanges 12a and 12b extend in parallel with each other. Each flange 12a and 12b can include a series of holes 12c that extend around the periphery, and are described in more detail below. The flanges 12a and 12b can be formed integrally with the body portion B or can be welded to the body portion B after manufacturing thereof.

The tubular body portion B of the spool 12 includes a hole "H" that extends through each flange 12a and 12b and the body portion B. The hole H is aligned about a central axis of the tubular body portion B and each flange 12 and 12b.

Figure 3B:
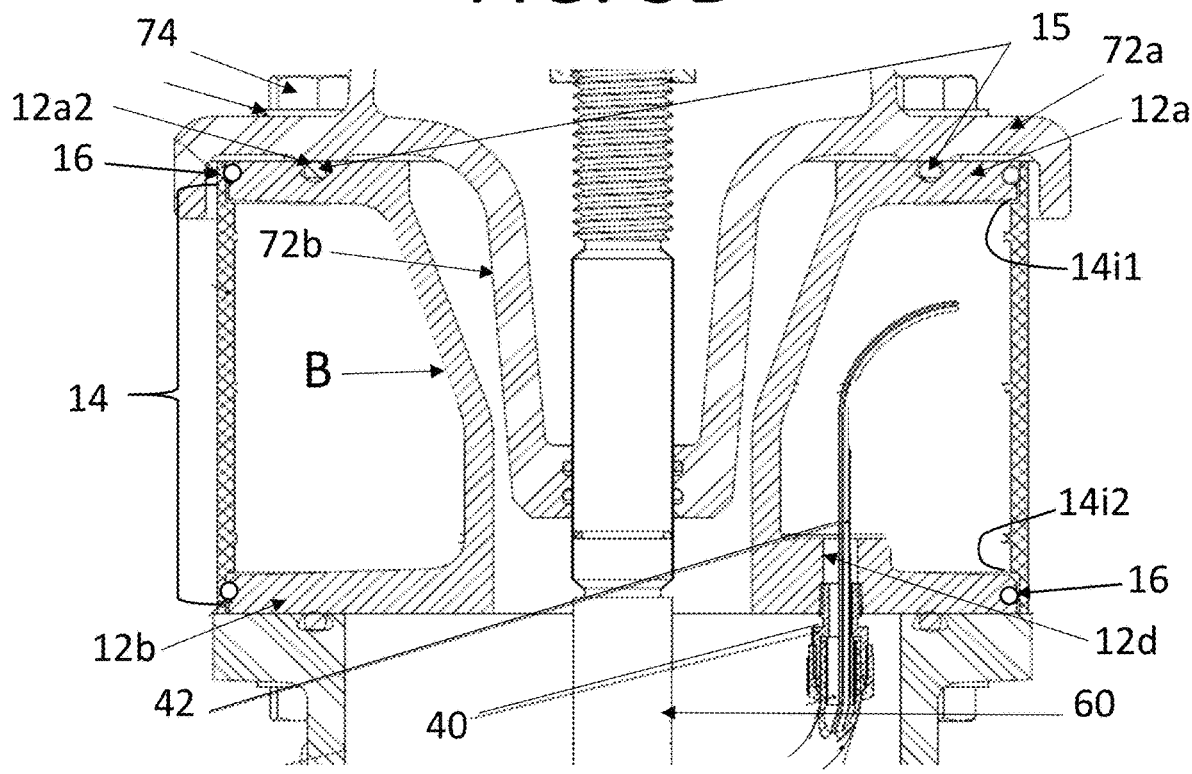
FIG. 3B illustrates a plan view of the wireless communication electronics storage apparatus of FIG. 2A.

Referring to FIG. 3B, the body portion B and its internal hole H can be tapered outward so that the wider portion of the body B and hole H can receive therein a lower portion 72b of the bonnet 72 (see FIGS. 2 and 3B), which also includes an axial hole extending therethrough to support the stem 60. Here the hole H through the flange 12a has the a larger diameter than the hole H through the flange 12b since the hole H and body portion B both taper outward from flange 12b to flange 12a.

Figure 4:
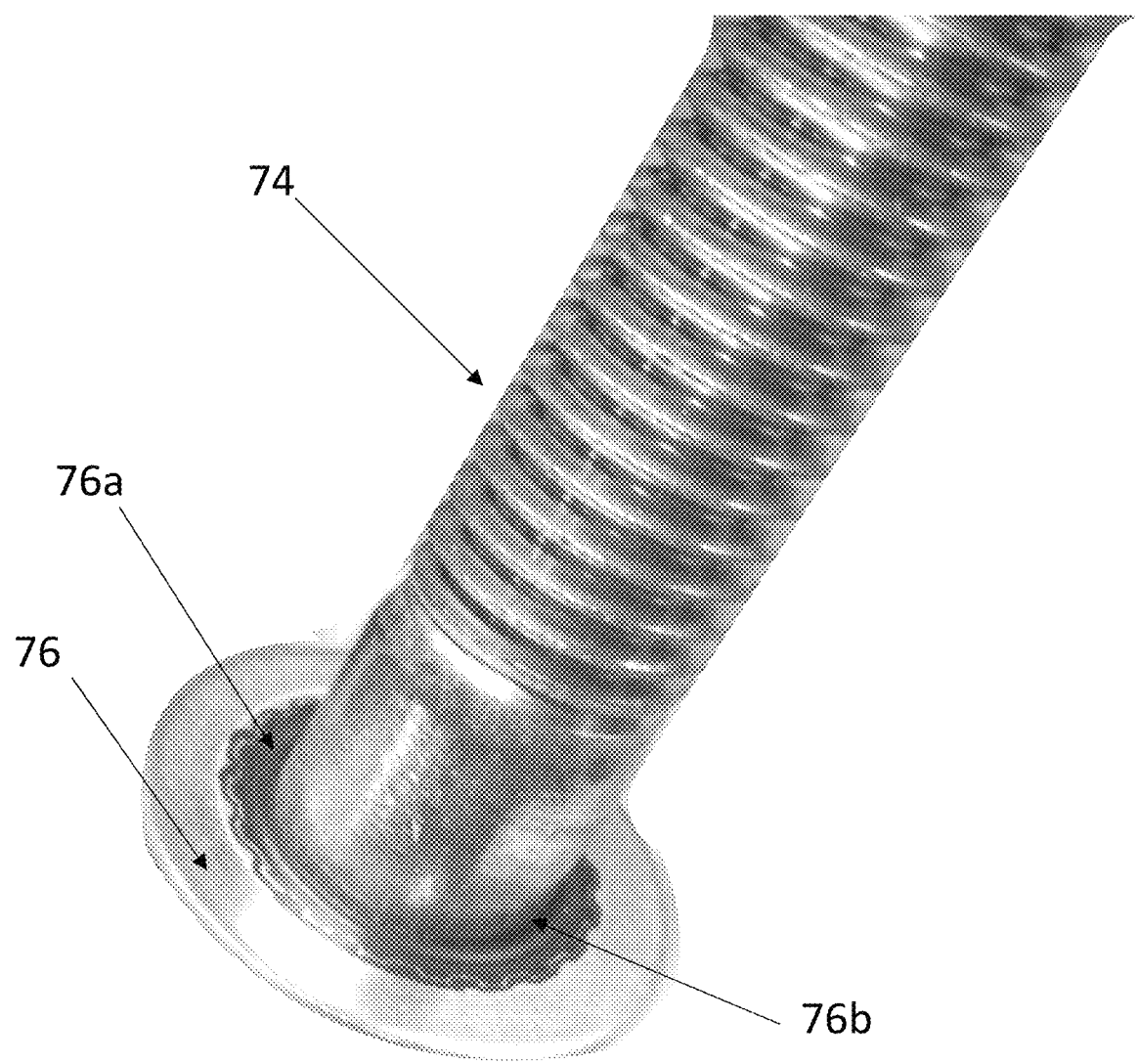
FIG. 4 illustrates a moisture prevention washer usable with the wireless communication electronics storage apparatus according to an exemplary embodiment of the present inventive concept.

As illustrated in FIG. 2A and FIG. 3B, the hole through the lower portion 72b of the bonnet 72 can receive the stem 60 therethrough such that the stem 60 can extend from the top portion of the bonnet 72, where it is connected to the operating stem nut 62 (see FIG. 2) down through the lower barrel portion (not illustrated) of the fire hydrant 1 to control a main valve for water flow. When the lip 72a of the bonnet 72 is seated on the flange 12a of the spool 12, the lower portion 72b of the bonnet 72 extends into the axial hole H in the body portion B of the spool 12. A set of bolts 74 can extend through holes (not illustrated) in the lip 72a and corresponding holes 12c in the flange 12a to fasten the bonnet 72 to the spool 12. Washers are generally used to help the bolts 74 remain tightly fastened to the object it is threaded to, such as the lip 72a of the bonnet 72. According to an exemplary embodiment, FIG. 3B illustrates the use of a washer 76 that can prevent moisture from entering into the hole 12c in flange 12a. Referring to FIG. 4, the washer 76 can be formed to have a rubber sealing bead 76a on both faces thereof and including an inner hole 76b in which the bolts 74 extend through. The rubber sealing bead 76a provides the feature of keeping moisture from passing through the holes in the lip 72a of the bonnet 72 and therefore also from reaching the holes 12c of the spool 12. As a result, moisture can be prevented from entering the area between the first flange 12a and the second flange 12b. Also illustrated in FIG. 4 is one of the bolts 74 (head part behind washer 76) that extends through the corresponding washer hole 76b before being inserted through corresponding holes in the lip 72a of the bonnet 72 and then threaded into the holes 12c of the spool 12.

Referring back to FIG. 3A, the first flange 12a and the second flange 12b can each include a groove 12a1 and 12b1 formed in an outer edge of the periphery of the respective flanges. An O-ring 16 can be provided to extend around the outer edge of each flange 12a and flange 12b. Each O-ring 16 can sit in the respective groove 12a1 and groove 12b1. Flange 12a also includes a side groove 12a2. A side groove 12a2 is also formed on a surface of the flange 12a opposite the surface in which the body portion B is connected. Groove 12a2 forms a complete circle that is disposed between the hole H and the outer edge of flange 12a. Side groove 12a2 can receive an O-ring 15 therein (see FIG. 3B) to provide a tight seal between the flange 12a and an inner surface of the lip 72a of the bonnet 72 to prevent water from leaking out of the hydrant 1.

FIGS. 2A and 3B illustrate a tubular-shaped weather guard 14 surrounding the spool 12 and in contact with the O-rings 16 seated within the grooves 12a1 and 12b1. A first inner end surface 14i1 of the weather guard 14 contacts one O-ring 16 and a second inner end surface 14i2 of the weather guard 14 contacts the other O-ring 16. By making contact with both O-rings 16 disposed in respective grooves 12a1 and 12a2, external environmental elements such as water, condensation, moisture, etc., can be prevented from entering between the flanges 12a and 12b, thus protecting electronics that are disposed therebetween. Electronics, such as, for example wireless communications electronics, may be disposed between flanges 12a and 12b and can include one or more circuit boards (not illustrated to provide brevity to this application) with cellular communications equipment. The circuit board(s) can be disposed at any location between the first flange 12a and the second flange 12b. The combination of the spool 12 and the weather guard 14, as illustrated in FIGS. 2 and 3B, forms the wireless communication electronics storage apparatus 10. The weather guard 14 can be made of an impact resistant plastic tube, for example a polyvinyl chloride (PVC) tube. The tube can also be formed from a Polycarbonate/Acrylonitrile Butadiene Styrene (ABS) blend, and is discussed in more detail with respect to FIG. 3B.

Referring to referring to FIG. 2B, a plurality of ribs 14a can also be provided to extend from the inner surface of the weather guard 14 toward the body portion B of the spool 12. More specifically, the ribs 14a can extend radially inward from the weather guard 14 to contact the body portion B of the spool 12, thus providing an area for electronics to be supported horizontally as well as additional support for the weather guard tube 14 itself. The ribs 14a can be formed integrally with the weather guard 14, or can be formed separately and then disposed between the body portion B of the spool 12 and the weather guard 14. The ribs 14a can be formed of the same material as the weather guard 14. The ribs 14a can be formed to different lengths to correspond with the size of the tapered body portion B, as illustrated in FIG. 2B and FIG. 3B.

A plurality of the bolts 74 extend through holes (not illustrated) in the rim 72a of the bonnet 72 and through corresponding holes 12c of the first flange 12a. A plurality of bolts 74 also extend through holes (not illustrated) in a rim 70a of the upper barrel 70 and through corresponding holes 12c of the second flange 12b. Each of the bolts 74 can include a washer 76 with the rubber sealing bead 76a to keep moisture from entering into the holes in the rim 72a of the bonnet 72 and the holes in the rim 70a of the upper barrel 70, and consequently prevent damage to any electrical components disposed between the first flange 12a, the second flange 12b and weather guard 14.

FIG. 3B illustrates a detailed side view of the upper hydrant wireless communication electronics storage apparatus 10 illustrated in FIG. 2. The flange 12b of the spool 12 can also include a compression fitting hole 12d extending therethrough and adjacent to the body portion B of the spool 12. The compressing fitting hole 12d can include threads formed therein to receive corresponding threads of a compression fitting 40. Wires 42 can extend through the compression fitting 40 so that electronic components disposed within the wireless communication electronics storage apparatus 10 can extend to sensors, such as pressure and temperature sensors, adjacent to or connected to a main valve at the opposite end of the stem 60 from the end of the stem 60 in which the operating stem nut 62 is connected, as described above with reference to FIG. 2. A tubing, such as a polyethylene tubing 50, can be connected to one end of the compression fitting 40 to cover the wires 42 as the wires 42 extend to the sensors at the main valve of the fire hydrant 1.

It is to be understood that the embodiments of the present inventive concept herein described are merely illustrative of the application of the principles of the present inventive concept. References herein to details of the illustrated embodiments are not intended to limit the scope of the claims, which themselves recite those features regarded as essential to the present inventive concept.

What is claimed is:

1. An upper hydrant wireless communication electronics storage apparatus comprising:
    a spool including:
        a body portion in the shape of a tube and having a hollow inside, a first end, and a second end;
        a first flange connected to the first end of the body portion and having a disc shape with a hole extending through the middle section thereof, the first flange including a first groove extending around an outer edge, a second groove extending around an outer surface and a plurality of holes extending around an outer periphery thereof between the outer edge of the second groove; and
        a second flange connected to the second end of the body portion and having a disc shape with a hole extending through the middle section thereof, the second flange including a groove extending around an outer edge and a plurality of holes extending around an outer periphery thereof adjacent the outer edge; and
    an O-ring disposed in each of the first groove and second groove of the first flange and the groove of the second flange; and
    a tubular device configured to slide over the first and second flanges such that a first end thereof forms a tight seal with the O-ring disposed in the first groove of the first flange and a second end thereof forms a tight seal with the O-ring disposed in the groove of the second flange.

2. The apparatus according to claim 1, wherein the body of the spool tapers inward from the first flange to the second flange.

3. The apparatus according to claim 2, wherein tubular device is formed of an impact resistant plastic.

4. The apparatus according to claim 1, wherein the second flange further includes a compressing fitting hole extending therethrough adjacent the body portion to receive a compressing fitting therein.

5. The apparatus according to claim 4, wherein tubular device comprises one or more ribs extending from an inner surface thereof and disposed at a predetermined distance from each other, the ribs having respective lengths to contact the outer surface of the body portion of the spool.

6. The apparatus according to claim 3, wherein tubular device is formed of a polyvinyl chloride (PVC) pipe or a polycarbonate/acrylonitrile butadiene styrene (ABS) blend.

7. The apparatus according to claim 5, wherein the tubular device and the ribs are integrally formed.

8. The apparatus according to claim 1, wherein the spool is formed of steel or a steel blend.

9. The apparatus according to claim 1, wherein the plurality of holes in the first flange and the second flange include threads therein to receive threaded bolts.

10. An electronics containment apparatus useable with a fire hydrant, the apparatus comprising:
    first and second discs integrally formed with a body disposed therebetween, the first and second discs including grooves extending around outer edges thereof to receive an O-ring therein, a plurality of holes extending around a periphery thereof adjacent to the outer edge, and a hole extending through a center portion thereof, and the body including a hole extending through a center thereof to connect the holes of the first and second discs;
    an O-ring disposed in each of the grooves of the first and second discs; and
    a tubular member having an inner surface of one end in pressing contact with the O-ring disposed in the groove of the first disc and an inner surface of an opposite end in pressing contact with the O-ring disposed in the groove of the second disc.

11. The apparatus according to claim 10, wherein the plurality of holes in the first and second discs are threaded to receive a respective threaded bolt to fasten the first disc to a bonnet of a fire hydrant and to fasten the second disc to an end of an upper barrel of a first hydrant.

12. The apparatus according to claim 11, wherein the first disc further comprises a circular groove formed in an outer side thereof between the plurality of holes and the hole extending through the center portion, the groove configured to receive an O-ring therein and provide a seal between the first disc and a bottom end of the bonnet.

13. The apparatus according to claim 12, wherein the body tapers outward from the second disc to the first disc such that the body can receive a bottom portion of the bonnet in the outward tapered end.

14. A method of mounting wireless communication electronic support equipment for sensors disposed below ground in a first hydrant, the method comprising:
    fastening a first disc member to a bonnet of a fire hydrant;
    fastening a second disc member to an upper barrel of the first hydrant;
    maintaining the bonnet and upper barrel a distance apart with a body portion connected at one end to the first disc member and connected at an opposite end to the second disc member; and
    sealing an inner surface of a first end of an impact resistant tubular member to a circumferential edge of the first disc member and an inner surface at a second end of the tubular member to a circumferential edge of the second disc member to form a weather-proof area between the first and second disc members for placement of the wireless communication electronic equipment.

15. The method according to claim 14, further comprising:
    fastening the first disc member to the bonnet using bolts and a waterproof washer that prevents moisture from entering respective bolt holes in the first and second disc members.

16. The method according to claim 15, further comprising:
    forming the tubular member from one of a polyvinyl chloride (PVC) pipe or a polycarbonate/acrylonitrile butadiene styrene (ABS) blend.

17. The method according to claim 15, wherein the body portion is formed to taper inward from the first disc member to the second disc member and is hollow inside such that an extended bottom portion of the bonnet can extend into the body portion.

18. The method according to claim 14, further comprising:
    forming a hole through the second disc member to allow wires to extend from the area between the first and second discs through the fire hydrant to sensors disposed at a main valve of the fire hydrant below ground.

19. The method according to claim 14, further comprising:
    forming a groove around the circumferential edge of the first disc member and the second disc member; and
    inserting an O-ring in the grooves of each of the first disc member and the second disc member which each form a tight seal with the inner surface of the tubular member.

20. The method according to claim 14, further comprising:
    forming a circular groove around a side surface of the first disc member opposite the side connected to the body portion; and
    inserting an O-ring into the circular groove to form a seal between the first disc member and an outer lip of the bonnet.

\* \* \* \* \*